Aug. 18, 1959     H. J. CROMWELL     2,900,058
CLUTCH FOR ENGINE STARTING DEVICE
Filed Feb. 17, 1954
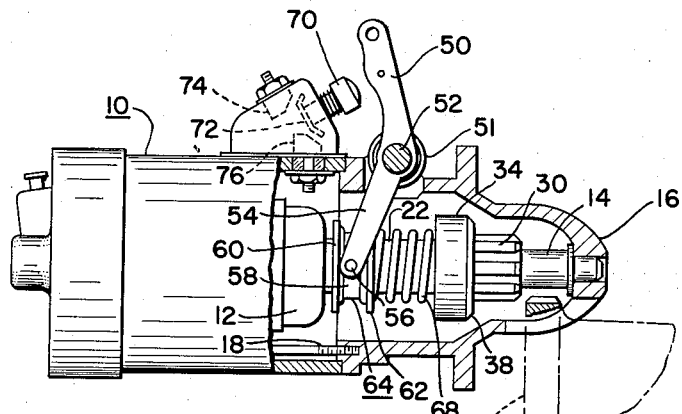
*Fig. 1*
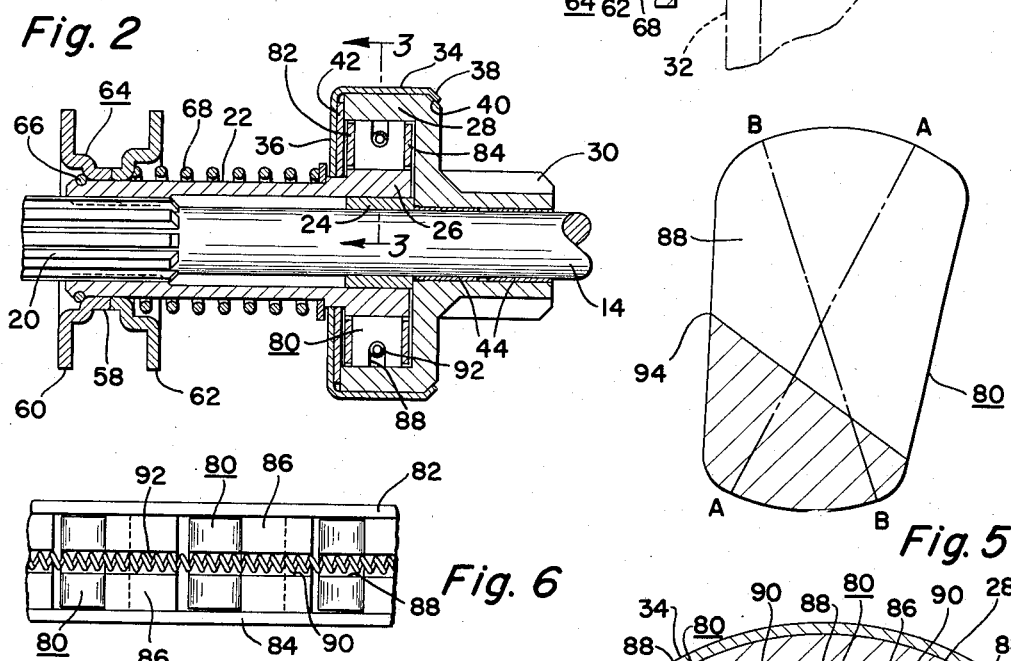
*Fig. 2*
*Fig. 5*
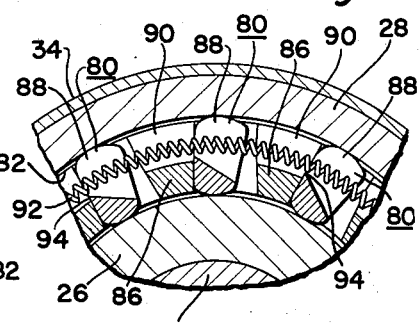
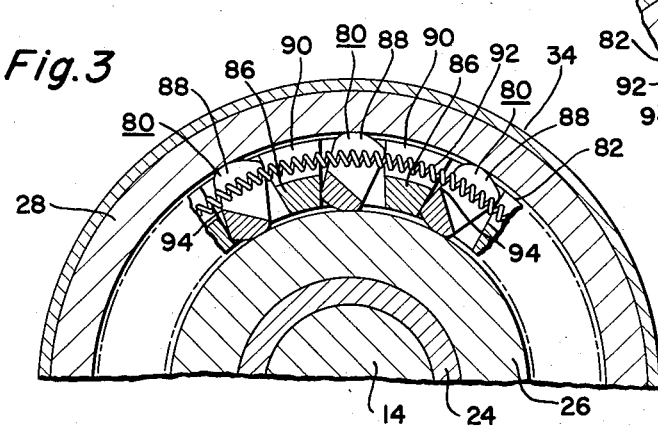
*Fig. 6*
*Fig. 4*
*Fig. 3*
INVENTOR.
Harold J. Cromwell
BY
His Attorney

United States Patent Office 2,900,058
Patented Aug. 18, 1959

2,900,058

CLUTCH FOR ENGINE STARTING DEVICE

Harold J. Cromwell, Anderson, Ind., assignor to General Motors Corporation, Detroit, Mich., a corporation of Delaware Application February 17, 1954, Serial No. 410,977

2 Claims. (Cl. 192—45.1)

This invention relates to engine starting apparatus and one-way overrunning clutches designed particularly for use in such apparatus to connect the starting motor with the engine to be started, but which can be used to connect other prime movers with the mechanism operated thereby.

Engine starting apparatus generally used on automotive vehicles includes a starting motor and an overrunning clutch of the roller type for connecting the motor to the engine. Such clutches have concentric driving and driven members with rollers therebetween which have a wedging action with camming surfaces formed on said members so as to form a driving connection between motor and engine. When the engine is started, the driven member overruns the driving member and the clutch is released.

Because of space limitations, it has been found that roller clutches which can be used do not have enough driving torque to be employed in heavy-duty installations, such as on buses and trucks, without slippage under some circumstances, which causes objectionable wear that will increase the tendency of the clutch to slip. Also, the torque capacity is sometimes insufficient to do the work required. To overcome these difficulties, it has been proposed to use clutches of the sprag type in such installations, in which, instead of rollers, tiltable gripping elements of irregular form, generally termed sprags, are positioned between the driving and driven elements of the clutch, which are smooth, cylindrical surfaces. These elements establish a driving connection between said driving and driven members when tilted in one direction, but permit free rotation of said driving member when tilted in the opposite direction, and also permit free rotation of the driven member when it is rotated faster than the driving member.

Clutches of this type have been found to have sufficient torque for use in the installations referred to and, in fact, have so great a maximum torque that, under some conditions where the load is unusually heavy, the pressure exerted by the sprags is so great that the surfaces of the driving and driven members are damaged and, with continued use, the efficiency of the clutch is impaired.

It is, therefore, an object of the present invention to provide a clutch of the sprag type having means to limit the maximum torque and the pressures which can be exerted by the sprags on the driving and driven members of the clutch irrespective of the load and driving force of the prime mover.

It is a further object of the invention to provide an engine starting apparatus having a clutch of the sprag type to connect the starting motor with the engine to be started which has sufficient driving torque to operate with heavy loads without slipping but is provided with means to limit the maximum driving torque to a value which is insufficient to cause damage to the clutch parts under any operating conditions.

Further objects and advantages of the present invention will be apparent from the following description, reference being had to the accompanying drawings wherein a preferred embodiment of the present invention is clearly shown.

In the drawings:

Figure 1 is a longitudinal view, partly in section, of an engine starting motor and associated clutch in which the present invention is embodied;

Figure 2 is a longitudinal view, partly in section, of the clutch and associated parts comprising the starter drive;

Figure 3 is a section on the line 3—3 of Figure 2;

Figure 4 is a detail section similar to Figure 3 but showing the gripping elements of the clutch in different position;

Figure 5 is an enlarged detail view of one of said gripping elements; and

Figure 6 is a fragmentary plan view of a part of the sprag retaining cage.

A clutch constructed according to the present invention is shown in the drawings associated with an engine starting motor of conventional construction having a field frame 10, a rotating armature 12 and a rotating shaft 14 on which the armature is supported and which rotates therewith. The motor is of entirely conventional construction and need not be further described.

The left end of the motor shaft 14, as seen in Fig. 1, is suitably journalled in an end plate (not shown) secured to the field frame 10 and the right end of such shaft is journalled in the wall of a housing 16 which houses the clutch and driving pinion and is suitably secured to the field frame by bolts 18.

The shaft 14 has external splines 20 formed thereon which cooperate with internal splines on a sleeve 22 which is slidable on the shaft 14. This sleeve has a bearing 24 journalled on a smooth portion of the shaft 14. The right end of the sleeve 22 is of enlarged outside diameter adjacent the bearing 24 as indicated at 26 to form what may be termed an inner clutch ring, and this ring is of the same outside diameter throughout, forming a cylindrical surface. Spaced from the inner clutch ring 26 is an outer clutch ring 28, the inner diameter of which is the same throughout, forming a cylindrical surface which is concentric with the surface of the inner ring 26. The outer clutch ring 28 is integral with the pinion 30, which is movable into engagement with the flywheel gear 32, shown in Fig. 1, by means later described and is operative to rotate said gear to start the engine when the outer ring 28 is rotatably connected to the inner ring 26, if the pinion is in engagement with said gear and the starting motor is energized.

The inner and outer clutch rings are maintained in assembled relation by a metal shell having a part 34 surrounding and engaging the outer surface of the outer clutch ring 28 and a part 36 normal thereto which is provided with a central opening through which the sleeve 22 extends. The retaining shell has an inwardly bent part 38 which engages a bevelled surface 40 formed on the outer clutch ring 28 and a washer 42 having a central opening that surrounds the sleeve 22 is positioned between the part 36 and the left end of the outer clutch ring 28, and also between the part 36 and a shoulder formed by the enlarged part of sleeve 22 which constitutes the inner clutch ring. Obviously, this retaining shell will prevent any axial movement of the outer clutch ring and pinion relative to the inner clutch ring and driving sleeve.

Pinion bearings 44 are journalled on the shaft 14 between the pinion and said shaft.

The whole clutch assembly is moved to the right, as seen in Fig. 1, by a lever 50 held in the normal position shown in the drawings by a torsion spring 51 and pivoted on a shaft 52 secured in any suitable way in the housing 16. The sleeve 22 is slidable on shaft 14 for this purpose, but is rotatable by the shaft in any position it may occupy through the medium of splines 20. The lower end of lever 50 is bifuracted so as to provide two arms 54 each of which has a pin 56. These pins engage a groove 58 on opposite sides of the motor shaft, said groove being formed between two flanges 60 and 62 of a collar 64 slidable on the sleeve 22 and normally held in the position shown in the drawings by a split ring 66 which engages a suitable groove in the outer surface of sleeve 22.

Movement of the collar 64 to the right in Fig. 1 exerts pressure on a spring 68 positioned between the collar 64 and shell 36, which effects movement of the clutch assembly and pinion to the right. If the teeth of the pinion 30 do not abut the teeth of the flywheel gear 32 as the pinion is moved to the right, such pinion moves freely into engagement with the flywheel gear without opposition and when fully engaged, the starting motor switch is closed and rotation of the motor effects rotation of the flywheel gear until the engine is started. When this takes place, the engine moves the outer clutch member faster than the inner clutch member is rotated by the motor, the clutch is released, as previously indicated, the lever 50 is returned to its original position by spring 51 effecting disengagement of the pinion and stopping of the motor.

If, upon movement of the clutch assembly and pinion to the right, the teeth of the pinion abut those of the flywheel gear, continued movement of the lever 50 will compress the spring 68 until the lever effects closing of the starting motor switch. This will cause rotation of the motor and pinion. Just as soon as the latter starts to rotate, it moves out of position where its teeth abut those of the flywheel gear into proper meshing position. The spring 68 will immediately expand, forcing the pinion into proper engagement with the fly wheel gear, after which the action will be as previously described.

As shown in the drawings, the lever 50 is adapted to be manually operated by any suitable form of operating connection which may be pivotally connected to the upper end of said lever. As the lever is moved to effect engagement of the pinion with the fly wheel gear, the upper part of the lever, after a predetermined movement thereof, engages a spring-held plunger 70 which carries a movable contact 72. Further movement of lever 50 after engagement thereof with the plunger 70 moves the contact 72 into engagement with two fixed contacts 74 and 76 to close the starting motor circuit and cause the motor to rotate and crank the engine. When the lever is released, the spring 51 returns it to normal position, opening the motor circuit and disengaging the pinion 30 from the flywheel gear 32.

At the present time closing of the motor circuit and movement of the clutch and pinion assembly is generally effected by the electromagnet which is rendered operative upon closing of the ignition switch, or a special manually operable push-button or other instrumentality. Such an operating mechanism is not shown herein, but the lever 50 may be operated by such a magnet instead of manually. A mechanism of this character is shown in the patent to Dyer, 2,105,643, January 18, 1938, in which Fig. 2 shows such a magnet energized upon closing of the ignition switch, and Fig. 3 shows a magnet which is not energized until a special manually operable switch is closed. Either of these arrangements could be substituted for the manual control shown and the function of lever 50 would be the same.

As previously indicated, whenever the starting motor is energized and the pinion 30 engaged with the engine gear 32, the engine will be rotated by the starting motor, if the sleeve 22 is rotatably connected to the pinion 30. To effect this connection, the inner clutch ring 26, which is the driving member of the clutch and is integral with the driving sleeve 22, is connected in driving relation with the outer clutch ring 28, which is the driven member of the clutch, through the medium of a series of tiltable, irregularly shaped elements 80, generally known as sprags.

According to the present invention, these sprags 80 are positioned between two annular collars 82 and 84 which are positioned in the space between the inner and outer clutch members and which have central openings therein which surround the inner clutch member, as shown in Fig. 2. These collars are positioned adjacent the ends of the sprags but are slightly spaced therefrom so that the sprags are freely tiltable and the distance between the collars is determined by blocks 86, one of which lies between each pair of adjacent sprags, that is, the blocks and sprags alternate. The collars 82 and 84 are secured by welding or in any other suitable way to the opposite ends of blocks 86 to form a cage for the sprags 80 and which is insertable in the space between the two clutch members. The blocks 86 are of such length that the collars 82 and 84 are properly spaced with reference to the ends of the sprags.

The outer edges of the sprags 80 and the outer edges of the blocks 86 have slots 88 and 90, respectively, in which is received a garter-type helical spring 92 which extends around the case and engages all of the sprags and blocks, the springs being effective to hold the sprags in position to engage the surfaces of the inner and outer clutch members, to facilitate the tilting of the sprags to gripping position when the inner clutch member is rotated in clockwise direction, as seen in Fig. 3.

The slots 88 in the sprags are deeper at the right side of the sprags, as seen in Fig. 3, than at the left so that the bottom of such slots forms an acute angle with the left side of the sprags and the points 94 lie between the sides thereof. Springs 92 engage these points and exert pressure on the sprags in a direction to tilt the sprags counterclockwise, as seen in Fig. 3. The slots 90 in blocks 86 must be deep enough to permit engagement of the spring with the sprags in the manner described.

The sprags are shaped, as best indicated in the enlarged view, Fig. 5, the distance on the line A—A being greater than that on the line B—B, so that if the sprags are tilted counter-clockwise, they will be gripped between the inner and outer clutch rings and the outer ring and pinion 30 will be driven by the inner ring. When the engine becomes self-operative, the outer ring overruns the inner ring, that is, such ring is driven by the engine in a clockwise direction faster than the inner ring is driven by the starting motor. This action tilts the sprags in a clockwise direction toward the Fig. 3 position enough to release the clutch and the pinion will run free without dragging the inner clutch ring and motor with it. Of course, when the switch is opened, the pinion will be withdrawn and the motor will stop.

The actions described are brought about because the spring 92 normally exerts a force tending to hold the sprags 80 in engagement with the surfaces of both clutch rings 26 and 28. When the starting motor is energized, friction between the surfaces of sprags 80 and the surfaces of the clutch rings tends to rotate the sprags 80 in a counter-clockwise direction and thereby the pressure exerted by the sprags on the two clutch rings is increased to such an extent that the motor shaft drives the starter pinion 30 and rotates the engine crankshaft to effect starting.

When the engine begins to operate under its own power, the outer clutch ring will rotate faster than ring 26 and thereby rotate the sprags in a clockwise direction until the pressure of the sprags on the clutch rings 26 and 28 is no more than that produced by the effect of spring 88 and the clutch will release. A further increase in rotational speed of pinion 30 by the engine will cause the effect of spring 88 to decrease due to the effect of centrifugal force on the spring, which will reduce the pressure between the sprags and the inner ring 26, but at the same time the effect of centrifugal force on the sprags will increase somewhat the friction on the outer ring independently of the spring.

As already indicated, in sprag clutches the torque can become so great with a heavy load that the pressure exerted by sprags 80 on the surfaces of the clutch rings will become great enough to form slight indentations in such surfaces. Ultimately, if this action continues over a considerable period of time, these indentations will cause slipping of the clutch and other difficulties. To prevent this damaging action, means are provided, according to the present invention, to limit the driving torque of the clutch to a predetermined maximum, so that the clutch will slip before the pressure exerted by the sprags on the clutch rings becomes sufficient to cause damage thereto.

The function is accomplished by the blocks 86, which lie between adjacent sprags throughout the entire length of the sprag retaining cage. The right face of each of these blocks lies at such an angle that the sprag to the right of the block can move to the position shown in Fig. 4 and no further, thus limiting the counter-clockwise tilting of the sprags and stopping them in a position where the pressure exerted thereby on the clutch rings is insufficient to cause damage, and the clutch will slip when the torque exceeds a predetermined maximum.

Obviously, the arrangement of parts can be reversed from that shown, with the outer clutch ring connected to the starting motor and the inner ring connected to the pinion 30, if such arrangement be desired.

As already indicated, although a clutch constructed in accordance with the present invention is of more or less general application, such clutch is particularly useful in engine starting apparatus and was designed primarily for such use in heavy-duty installations where the conventional roller type starting clutch is not altogether satisfactory because of insufficient driving torque which sometimes results in slippage with heavy loads. It has previously been proposed to substitute a sprag clutch for the usual roller clutch in order to obtain increased torque and eliminate the difficulties encountered when a roller clutch is used to start large engines. The torque of the sprag clutch has been found sufficient to overcome the difficulties encountered but under some circumstances, as already set forth, is great enough to create the difficulty the present invention is designed to overcome.

The driving torque of the clutch can, of course, be varied by the shape of the block 86 and the extent of tilting of the sprags which is permitted, the greater degree of tilt permitted, the greater the torque. The blocks are preferably designed to permit the driving torque of the clutch to be as high as possible without causing the damage previously described.

While the embodiment of the present invention as herein disclosed constitutes a preferred form, it is to be understood that other forms might be adopted.

What is claimed is as follows:

1. A one-way overrunning clutch comprising; inner and outer spaced clutch rings, one of rings being a driving member and the other ring being a driven member, a plurality of tiltable gripping elements positioned in the space between the inner and outer rings for establishing driving connection between said rings when said elements are tilted in a predetermined direction, means for limiting the pressure exerted by said tiltable elements on said driving and driven members to a predetermined maximum, when said elements are tilted in said predetermined direction, said means comprising a plurality of wedge-shaped blocks each having flat side surfaces extending across their lengths and each of which is positioned between adjacent tiltable elements and arranged to have one flat side engaged by one of tiltable elements when said element is tilted in said predetermined direction to effect the driving connection between said driving and driven elements, an open ended slot in each of said elements extending from an outer edge thereof, an open ended slot in each block facing the outer clutch ring and located in alignment with the slots in said elements, and a garter spring received in said slots of each element and normally exerting a force on each element tending to tilt said elements in said predetermined direction, said slots being of sufficient width as to permit said spring to move in the slots under centrifugal force, said spring being arranged in said slots and responsive to the action of centrifugal force and movable thereby to relieve the force normally exerted by said spring on the tiltable elements when the clutch assembly is rotated at or above a predetermined speed.

2. A one-way overrunning clutch operable to establish driving connection between a prime mover and mechanism operated thereby and having in combination inner and outer clutch rings, one of which is a driving member adapted to be rotatably connected to said prime mover and the other of which is a driven member adapted to be operatively connected to said mechanism, a plurality of tiltable gripping elements each having an open-ended slot facing the outer clutch ring positioned in the space between said inner and outer clutch rings and tiltable in one direction to establish driving connection between the driving and driven members, means to limit the movement of said elements in one direction in order to limit the pressure exerted by said elements on said driving and driven members to a predetermined maximum, said means comprising; a plurality of wedge shaped blocks each having an open ended slot facing the outer clutch ring and located in alignment with the slots in said gripping elements and each of which is positioned between adjacent tiltable elements and engageable thereby when said elements are moved to connect said driving and driven members, said wedge shaped blocks having flat side surfaces extending across their lengths which are engageable with said gripping elements, and an annular spring positioned in the open ended slots of said gripping elements and blocks, said slots being of a width as to freely receive said spring whereby said spring may move in said slots under centrifugal force.

References Cited in the file of this patent

UNITED STATES PATENTS

| | | |
|---|---|---|
| 2,211,053 | Critchfield | Aug. 13, 1940 |
| 2,366,842 | Dodge et al. | Jan. 9, 1945 |
| 2,386,013 | Swenson | Oct. 2, 1945 |
| 2,389,961 | Dodge | Nov. 27, 1945 |
| 2,477,176 | Gruenberg et al. | July 26, 1949 |
| 2,562,196 | Lewis | July 31, 1951 |
| 2,633,952 | Zeider | Apr. 7, 1953 |
| 2,636,584 | Swenson | Apr. 28, 1953 |
| 2,748,912 | Banker | June 5, 1956 |